US009599705B2

(12) United States Patent
Wu et al.

(10) Patent No.: US 9,599,705 B2
(45) Date of Patent: Mar. 21, 2017

(54) MILLIMETRE WAVE THREE DIMENSIONAL HOLOGRAPHIC SCAN IMAGING APPARATUS AND METHOD FOR INSPECTING A HUMAN BODY OR AN ARTICLE

(71) Applicant: Nuctech Company Limited, Haidian District, Beijing (CN)

(72) Inventors: Wanlong Wu, Beijing (CN); Zhiqiang Chen, Beijing (CN); Yuanjing Li, Beijing (CN); Ziran Zhao, Beijing (CN); Zongjun Shen, Beijing (CN); Li Zhang, Beijing (CN); Bin Sang, Beijing (CN); Chenguang Zhu, Beijing (CN)

(73) Assignee: Nuctech Company Limited, Haidian District, Beijing (CN)

( * ) Notice: Subject to any disclaimer, the term of this patent is extended or adjusted under 35 U.S.C. 154(b) by 116 days.

(21) Appl. No.: 14/247,803

(22) Filed: Apr. 8, 2014

(65) Prior Publication Data
US 2015/0048253 A1  Feb. 19, 2015

(30) Foreign Application Priority Data

Aug. 15, 2013 (CN) .......................... 2013 1 0356954

(51) Int. Cl.
*G01S 13/89* (2006.01)
*G01S 13/88* (2006.01)
*G01V 8/00* (2006.01)

(52) U.S. Cl.
CPC ............ *G01S 13/89* (2013.01); *G01S 13/887* (2013.01); *G01V 8/005* (2013.01)

(58) Field of Classification Search
CPC ....... G01S 13/887; G01S 13/89; G01V 8/005; G01N 22/08
See application file for complete search history.

(56) References Cited

U.S. PATENT DOCUMENTS 5,455,590 A    10/1995 Collins et al.
7,405,692 B2 *  7/2008 McMakin ................ G01S 7/20
                                              342/22
(Continued)

FOREIGN PATENT DOCUMENTS

CN    102508306 A      6/2012
CN    103197353 A  *   7/2013
(Continued)

OTHER PUBLICATIONS

English machine translation of CN 103197353 A.*
(Continued)

*Primary Examiner* — David Porta
*Assistant Examiner* — Mindy Vu
(74) *Attorney, Agent, or Firm* — Merchant & Gould P.C.

(57) ABSTRACT

A millimeter wave three dimensional holographic scan imaging apparatus and a method for inspecting a human body or an article are disclosed. The apparatus comprises a first millimeter wave transceiver module, a second millimeter wave transceiver module, a first guide rail device to which the first millimeter wave transceiver module is connected in slidable form, a second guide rail device to which the second millimeter wave transceiver module is connected in slidable form, a driver configured to drive the first/second millimeter wave transceiver module to move along the first/second guide rail device, and a constrainer configured to constrain kinematic relation between the first and the second millimeter wave transceiver modules such that they only move in directions opposed to each other. They may increase scan speeds, improve scan stability, reduce scan operations and enhance the reliability of the apparatus.

15 Claims, 3 Drawing Sheets

(56) References Cited

U.S. PATENT DOCUMENTS

| | | |
|---|---|---|
| 8,723,716 B2 | 5/2014 | Nakasha |
| 2005/0206516 A1 | 9/2005 | Tsuji |
| 2005/0232459 A1 | 10/2005 | Rowe et al. |
| 2010/0220001 A1 | 9/2010 | Longstaff |

FOREIGN PATENT DOCUMENTS

| | | |
|---|---|---|
| CN | 203385856 U | 1/2014 |
| JP | 2005-265615 A | 9/2005 |
| JP | 2007-517275 A | 6/2007 |
| JP | 2007-187632 A | 7/2007 |
| JP | 2011-196900 A | 10/2011 |
| JP | 2011-237417 A | 11/2011 |
| WO | 2010/032003 A1 | 3/2010 |

OTHER PUBLICATIONS

Russian Office Action for corresponding Russian Patent Application No. 2014119983 issued Jul. 16, 2015.
Japanese Office Action for corresponding Japanese Patent Application No. 2014-101249 mailed Nov. 20, 2015.
Extended European Search Report for corresponding European Patent Application No. 14162755.4 mailed Dec. 22, 2015.
Chinese Office Action for corresponding Chinese Patent Application No. 201310356954.1 mailed Jun. 3, 2016, 18 pgs. English translation included.

* cited by examiner

MILLIMETRE WAVE THREE DIMENSIONAL HOLOGRAPHIC SCAN IMAGING APPARATUS AND METHOD FOR INSPECTING A HUMAN BODY OR AN ARTICLE

CROSS-REFERENCE TO RELATED APPLICATION

This application claims the benefit of Chinese Patent Application No. 201310356954.1 filed on Aug. 15, 2013 in the State Intellectual Property Office of China and which application is incorporated herein by reference. To the extent appropriate, a claim of priority is made to the above disclosed application.

BACKGROUND OF THE INVENTION

1. Field of the Invention

The present invention generally relates to a technical field of human body security inspection, in particular to a millimeter wave three dimensional holographic scan imaging apparatus and a method for inspecting a human body or an article using the same.

2. Description of the Related Art

The imaging safety inspection technology for a human body or an article used widely at present mainly comprises X ray imaging technology and millimeter wave imaging technology. The millimeter wave imaging technology becomes more popular in these years. It can in principle be classified into passive millimeter wave imaging technology and active millimeter wave imaging technology. The holographic imaging technology is the most important form of the active millimeter wave imaging technology.

In the active millimeter wave three dimensional holographic imaging technology for human body safety inspection, the cylindrical scan imaging technology has been used widely. However, the cylindrical scan imaging apparatus has a huge volume and a complex algorithm which is derived by approximation processes in theory, and thus its imaging accuracy is limited. Further, a cylindrical scan may only use a vertical antenna array which has a large length and too many antenna units, thus increasing the cost of apparatus.

Further, the active millimeter wave three dimensional holographic imaging apparatus in form of single side scan only inspects one side of the human body to be inspected at once and thus, the whole inspection for the human body needs to perform two scans. The human body to be inspected needs to turn around between two scans so that the safety inspection process becomes complicated and has a low inspection speed. In the active millimeter wave three dimensional holographic imaging apparatus in form of single side scan, once it is powered off or other failures occur, a millimeter wave transceiver module therein may tend to fall down and may be damaged. In order to prevent it being damaged, the apparatus needs to be provided with components like counter weights, internal contracting brakes, buffers, and so on, which causes a high complexity and a low reliability of the system.

SUMMARY OF THE INVENTION

An object of the present invention is to provide a millimeter wave three dimensional holographic scan imaging apparatus which can perform the millimeter wave three dimensional holographic scan imaging rapidly and efficiently and can simplify the structure thereof.

A further object of the present invention is to provide a method for inspecting a human body or an article using the millimeter wave three dimensional holographic scan imaging apparatus which can perform the inspection globally, conveniently and fast. It is in particular suitable to various applications of security inspection for a human body or an article.

To this end, the present invention may be implemented by the follows.

In accordance with one aspect of the present invention, it provides a millimeter wave three dimensional holographic scan imaging apparatus, comprising:

a first millimeter wave transceiver module comprising a first millimeter wave transceiver antenna array for transmitting and receiving a first millimeter wave signal;

a second millimeter wave transceiver module comprising a second millimeter wave transceiver antenna array for transmitting and receiving a second millimeter wave signal;

a first guide rail device, to which the first millimeter wave transceiver module is connected in slidable form, such that the first millimeter wave transceiver module is moveable along the first guide rail device to perform a first scan on an object to be inspected;

a second guide rail device, to which the second millimeter wave transceiver module is connected in slidable form, such that the second millimeter wave transceiver module is moveable along the second guide rail device to perform a second scan on the object to be inspected;

a driver configured to drive the first millimeter wave transceiver module to move along the first guide rail device and/or to drive the second millimeter wave transceiver module to move along the second guide rail device; and a constrainer configured to constrain kinematic relation between the first millimeter wave transceiver module and the second millimeter wave transceiver module such that the first millimeter wave transceiver module and the second millimeter wave transceiver module only move in directions opposed to each other.

In an embodiment, the constrainer may constrain positional relation between the first millimeter wave transceiver module and the second millimeter wave transceiver module such that the first millimeter wave transceiver module and the second millimeter wave transceiver module only move in a same speed.

In a further embodiment, the constrainer may be a rigid connecting line or belt for connecting the first millimeter wave transceiver module and the second millimeter wave transceiver module.

In a further embodiment, the first guide device may be provided with a first fixed pulley and the second guide device may be provided with a second fixed pulley, the connecting line or belt can be connected to the second millimeter wave transceiver module from the first millimeter wave transceiver module via the first fixed pulley and the second fixed pulley.

In a further embodiment, the driver may be configured to drive the first millimeter wave transceiver module and/or the second millimeter wave transceiver module to move by driving the constrainer.

In a further embodiment, the driver may comprise a first driver configured to drive the first millimeter wave transceiver module directly, the first millimeter wave transceiver module being connected to the first guide rail device by the first driver, and/or the driver may comprise a second driver configured to drive the second millimeter wave transceiver module directly, the second millimeter wave transceiver module being connected to the second guide rail device by the second driver.

In a further embodiment, the first guide rail device and the second guide rail device may be parallel to each other.

In a further embodiment, the first guide rail device and/or the second guide rail device may be composed of one rail or a plurality of rails parallel to each other.

In a further embodiment, the first millimeter wave transceiver module and/or the second millimeter wave transceiver module may move in a vertical plane.

In a further embodiment, the apparatus may further comprise:

a data processing device communicated by wire or wireless to the first millimeter wave transceiver module and/or the second millimeter wave transceiver module to receive scan data from the first millimeter wave transceiver module and/or the second millimeter wave transceiver module and to generate a millimeter wave holographic image; and a display device communicated to the data processing device to receive and display the millimeter wave holographic image from the data processing device.

In a further embodiment, the data processing device may be configured to generate a control signal and transmit it to the driver to allow the driver to drive the first millimeter wave transceiver module and/or the second millimeter wave transceiver module to move; or the millimeter wave three dimensional holographic scan imaging apparatus further comprises a separate controller with respect to the data processing device, the separate controller configured to generate a control signal and transmit it to the driver to allow the driver to drive the first millimeter wave transceiver module and/or the second millimeter wave transceiver module to move.

In a further embodiment, the first millimeter wave signal and the second millimeter wave signal may have different frequencies in at least 50% of an entire period of scanning the object to be inspected by both the first millimeter wave transceiver module and the second millimeter wave transceiver module.

In a further embodiment, the time at which the first millimeter wave transceiver antenna array transmits millimeter waves may be different from the time at which the second millimeter wave transceiver antenna array transmits millimeter waves during scanning the object to be inspected by both the first millimeter wave transceiver module and the second millimeter wave transceiver module.

In accordance with another aspect of the present invention, it provides a method for inspecting a human body or an article using a millimeter wave three dimensional holographic scan imaging apparatus, comprising:

locating the human body or the article at an inspection position and setting a first millimeter wave transceiver module and a second millimeter wave transceiver module at their scan beginning positions respectively;

driving the first millimeter wave transceiver module and the second millimeter wave transceiver module by a driver to move from their scan beginning positions to their scan end positions along a first guide rail device and a second guide rail device continuously or discontinuously to achieve scanning to the human body or the article;

transmitting data sampled by the first millimeter wave transceiver module and the second millimeter wave transceiver module during the scanning to a data processing device, in the scanning and/or after the scanning; and processing the data received from the first millimeter wave transceiver module and the second millimeter wave transceiver module using the data processing device to generate a millimeter wave holographic image of the human body or the article, wherein during scanning of the first millimeter wave transceiver module and the second millimeter wave transceiver module, kinematic relation between the first millimeter wave transceiver module and the second millimeter wave transceiver module is constrained by a constrainer such that the first millimeter wave transceiver module and the second millimeter wave transceiver module only move in directions opposed to each other.

In a further embodiment, during scanning of the first millimeter wave transceiver module and the second millimeter wave transceiver module, positional relation between the first millimeter wave transceiver module and the second millimeter wave transceiver module is constrained by the constrainer such that the first millimeter wave transceiver module and the second millimeter wave transceiver module only move in a same speed.

In a further embodiment, the constrainer may be a rigid connecting line or belt for connecting the first millimeter wave transceiver module and the second millimeter wave transceiver module.

In a further embodiment, during scanning, it is possible to drive the first millimeter wave transceiver module and/or the second millimeter wave transceiver module to move by driving the first millimeter wave transceiver module and/or the second millimeter wave transceiver module directly or by driving the constrainer.

In a further embodiment, a first millimeter wave signal for the first millimeter wave transceiver module and a second millimeter wave signal for the second millimeter wave transceiver module have different frequencies in at least 50% of an entire period of scanning the human body or the article to be inspected by both the first millimeter wave transceiver module and the second millimeter wave transceiver module.

In a further embodiment, the time at which the first millimeter wave transceiver antenna array for the first millimeter wave transceiver module transmits millimeter waves is different from the time at which the second millimeter wave transceiver antenna array for the second millimeter wave transceiver module transmits millimeter waves during scanning the human body or the article to be inspected by both the first millimeter wave transceiver module and the second millimeter wave transceiver module.

In a further embodiment, after generating the millimeter wave holographic image of the human body or the article, an automatic identification on whether the human body or the article entrains suspected objects and on the position of the suspected objects is carried out and the identified results are outputted.

On basis of at least one of the above aspects, linkage of two millimeter wave transceiver modules can be achieved by a constrainer. It can increase scan speeds, improve scan stability, simplify scan operations and enhance reliability of the apparatus.

BRIEF DESCRIPTION OF THE DRAWINGS

These and other aspects as well as advantages of the present invention will become apparent and readily understood from the description of the preferred embodiments taking in conjunction with the accompanying drawings, in which.

DETAILED DESCRIPTION OF THE EMBODIMENTS

Figure 1:
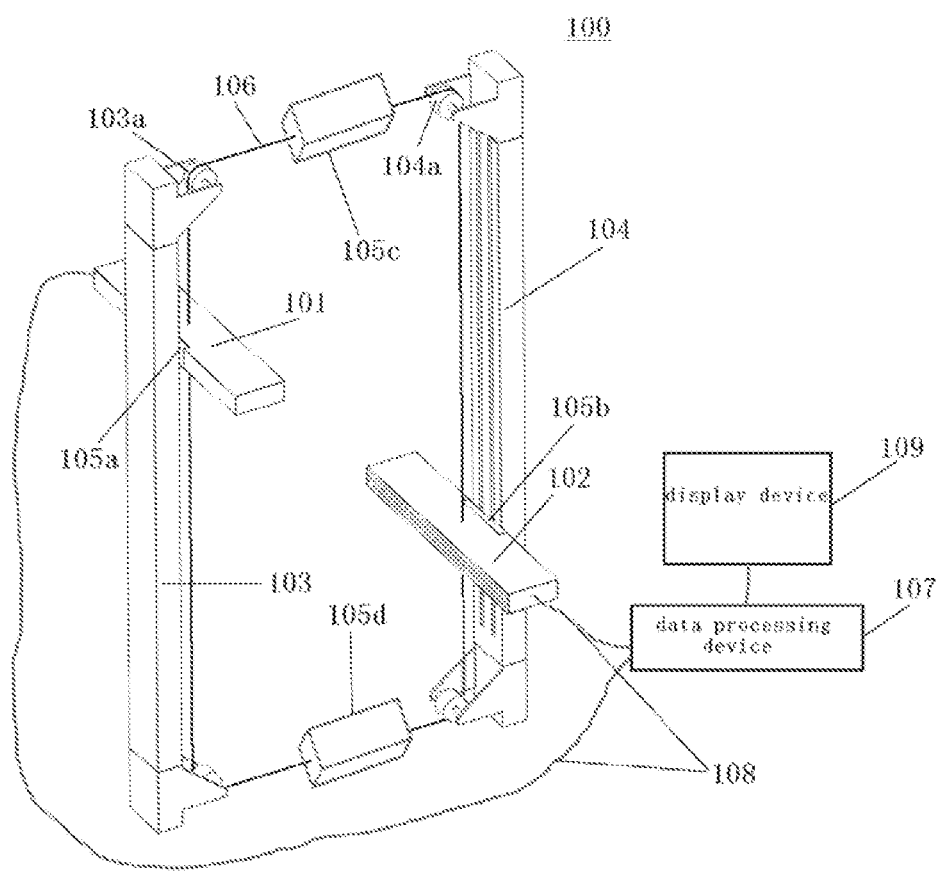
FIG. 1 shows schematically a construction of a millimeter wave three dimensional holographic scan imaging apparatus according to an embodiment of the present invention.

Technical solutions of the present invention will be described hereinafter in more detail by the way of embodiment with reference to figures of the attached drawings, wherein the same or like reference numerals refer to the same or like elements throughout the specification. The explanation to the embodiment of the present invention with referring to the accompanying drawings is intended to interpret the general inventive concept of the present invention, rather than being construed as a limiting to the present invention.

FIG. 1 shows schematically a millimeter wave three dimensional holographic scan imaging apparatus 100 according to an embodiment of the present invention. It may include a first millimeter wave transceiver module 101, a second millimeter wave transceiver module 102, a first guide rail device 103, a second guide rail device 104, a driver 105a, 105b, 105c, 105d and a constrainer 106. The first millimeter wave transceiver module 101 comprises a first millimeter wave transceiver antenna array for transmitting and receiving a first millimeter wave signal. And the first millimeter wave transceiver module 101 is connected in slidable form to the first guide rail device 103, such that the first millimeter wave transceiver module 101 is moveable along the first guide rail device 103 to perform a first scan on an object to be inspected. Likewise, the second millimeter wave transceiver module 102 comprises a second millimeter wave transceiver antenna array for transmitting and receiving a second millimeter wave signal and is connected in slidable form to the second guide rail device 104, such that the second millimeter wave transceiver module 102 is moveable along the second guide rail device 104 to perform a second scan on the object to be inspected.

That is, the millimeter wave three dimensional holographic scan imaging apparatus 100 in accordance with the present invention may scan the object to be inspected in two orientations at the same time, for example, scan a front side and a back side of the object (such as a human body or an article) at the same time. It can improve the inspection efficiency significantly, for example, when the object to be inspected is the human body, the apparatus can scan the front side and the back side of the human body at the same time without needing the human body to turn around. It will be helpful to increase the inspection efficiency. It should be noted that the arrangement of the first millimeter wave transceiver module 101 and the second millimeter wave transceiver module 102 facing to each other, as shown in FIG. 1, is not necessary, for example, if a better imaging effect may be achieved in a certain orientation, the first millimeter wave transceiver module 101 and the second millimeter wave transceiver module 102 may be arranged to not face to each other, but allowing the directions in which they transmit millimeter waves to be angled to each other.

The driver 105a, 105b, 105c and 105d is configured to drive the first millimeter wave transceiver module 101 to move along the first guide rail device 103 and/or to drive the second millimeter wave transceiver module 102 to move along the second guide rail device 104. FIG. 1 shows various drivers, including a first driver 105a for driving the first millimeter wave transceiver module 101 directly, a second driver 105b for driving the second millimeter wave transceiver module 102 directly and drivers 105c, 105d for driving the first millimeter wave transceiver module 101 and/or the second millimeter wave transceiver module 102 by driving the constrainer 106 (in the case shown in FIG. 1, it is a line or belt). However, all of these drivers are not necessary, for example, the millimeter wave three dimensional holographic scan imaging apparatus 100 may include only one or some of these drivers 105a, 105b, 105c and 105d. In case that more than one of drivers are provided, they may be operated independently or in combination as long as they can drive the first millimeter wave transceiver module 101 and/or the second millimeter wave transceiver module 102 to perform actions of scanning. In case that the above first driver 105a and/or second driver 105b are/is provided, the first millimeter wave transceiver module 101 may be connected to the first guide rail device 103 via the first driver 105a and/or the second millimeter wave transceiver module 102 may be connected to the second guide rail device 104 via the second driver 105b.

The constrainer 106 is configured to constrain the kinematic relation between the first millimeter wave transceiver module 101 and the second millimeter wave transceiver module 102 such that the first millimeter wave transceiver module 101 and the second millimeter wave transceiver module 102 only or have to move in directions opposed to each other. The constrainer 106 can enable the first millimeter wave transceiver module 101 and the second millimeter wave transceiver module 102 to move in cooperation with each other without additional accurate control and thus simplifying the system. Further, constraining the first millimeter wave transceiver module 101 and the second millimeter wave transceiver module 102 to move only in directions opposed to each other, may cause them to be staggered in position instead of being faced to each other in most of the period during scanning. Thus, the disturbance between the first millimeter wave transceiver module 101 and the second millimeter wave transceiver module 102 can be reduced, compared to the case that they move in the same direction.

In an example, the constrainer 106 may also constrain the positional relation between the first millimeter wave transceiver module 101 and the second millimeter wave transceiver module 102 such that the first millimeter wave transceiver module 101 and the second millimeter wave transceiver module 102 only move in a same speed. For example, the constrainer 106 may be a rigid connecting line or belt for connecting the first millimeter wave transceiver module 101 and the second millimeter wave transceiver module 102, as shown in FIG. 1. The so-called rigid connecting line or belt means that the connecting line or belt is substantially non-elastic or has a length change which may be neglected if the line or belt is drawn by a nominal force. When the rigid connecting line or belt is tighten up by a drawing force, the connecting line or belt between the first millimeter wave transceiver module 101 and the second millimeter wave transceiver module 102 has a fixed length. Therefore, if one of the first millimeter wave transceiver module 101 and the second millimeter wave transceiver module 102 moves in a direction (for example in an upper direction), the other of them must move in an opposite direction and they have an equal moving speed.

In order to arrange the rigid connecting line or belt more conveniently, as an example, a fixed pulley may be used. For example, the first guide rail device 103 may be provided with a first fixed pulley 103a and the second guide rail device 104 may be provided with a second fixed pulley 104a. The connecting line or belt may connect the first millimeter wave transceiver module 101 to the second millimeter wave transceiver module 102 via the first fixed pulley 103a and the second fixed pulley 104a.

Although the rigid connecting line or belt is used as the constrainer 106 in the embodiment as shown in FIG. 1, it is not necessary, as appreciated by the skilled person in the art. Other forms of constrainers 106 may also be used, for example, the constrainer 106 may be implemented as mechanical structure similar to seesaw, or implemented by the pneumatic, hydraulic, magnetic or electrostatic drawing or other known means in the art.

In an example, the first guide rail device 103 and the second guide rail device 104 may be substantially parallel to each other. However, it is not necessary, for example, for the sake of convenient arrangement, they may be angled to each other. In an example, the first guide rail device 103 and/or the second guide rail device 104 may be composed of one rail or a plurality of rails parallel to each other. The latter allows the first millimeter wave transceiver module 101 and/or the second millimeter wave transceiver module 102 to move more stably.

In an example, the first millimeter wave transceiver module 101 and/or the second millimeter wave transceiver module 102 may move in a vertical plane. In such case, due to effects of gravity, the first millimeter wave transceiver module 101 and the second millimeter wave transceiver module 102 may be balanced in weight such that they can move more stably. In particular, in case that they use the connecting line or belt as the constrainer 106, it also may prevent the first millimeter wave transceiver module 101 and/or the second millimeter wave transceiver module 102 from being damaged due to unexpected falling upon a failure in the system occurs.

In an example, the millimeter wave three dimensional holographic scan imaging apparatus 100 may further comprise a data processing device 107. The data processing device 107 is communicated by wire (for example by wires 108) or wireless to the first millimeter wave transceiver module 101 and/or the second millimeter wave transceiver module 102 to receive scan data from the first millimeter wave transceiver module 101 and/or the second millimeter wave transceiver module 102 and to generate a millimeter wave holographic image. The millimeter wave three dimensional holographic scan imaging apparatus 100 may further comprise a display device 109. The display device 109 is communicated to the data processing device 107 to receive and display the millimeter wave holographic image from the data processing device 107.

In an example, the data processing device 107 may be configured to generate a control signal and transmit it to the driver 105a, 105b, 105c and 105d to allow the driver 105a, 105b, 105c and 105d to drive the first millimeter wave transceiver module 101 and/or the second millimeter wave transceiver module 102 to move. As another example, the millimeter wave three dimensional holographic scan imaging apparatus 100 may also include a separate controller with respect to the data processing device 107, the separate controller configured to generate a control signal and transmit it to the driver 105a, 105b, 105c and 105d to allow the driver 105a, 105b, 105c and 105d to drive the first millimeter wave transceiver module 101 and/or the second millimeter wave transceiver module 102 to perform scanning motion.

In order to reduce the signal disturbance between the first millimeter wave transceiver module 101 and the second millimeter wave transceiver module 102, as an example, the first millimeter wave signal transmitted and received by the first millimeter wave transceiver module 101 and the second millimeter wave signal transmitted and received by the second millimeter wave transceiver module 102 may have different frequencies in at least 50% of an entire period of scanning the object to be inspected by both the first millimeter wave transceiver module 101 and the second millimeter wave transceiver module 102, for example, in all of the entire period or in the part of the entire period in which the first millimeter wave transceiver module 101 is relative close to the second millimeter wave transceiver module 102.

In another example, the time at which the first millimeter wave transceiver antenna array transmits millimeter waves in the first millimeter wave transceiver module 101 may be different from the time at which the second millimeter wave transceiver antenna array in the second millimeter wave transceiver module 102 transmits millimeter waves during scanning the object to be inspected by both the first millimeter wave transceiver module 101 and the second millimeter wave transceiver module 102, that is, they transmit the respective millimeter waves at different times. It may also reduce or avoid the signal disturbance between the first millimeter wave transceiver module 101 and the second millimeter wave transceiver module 102.

Figure 2:
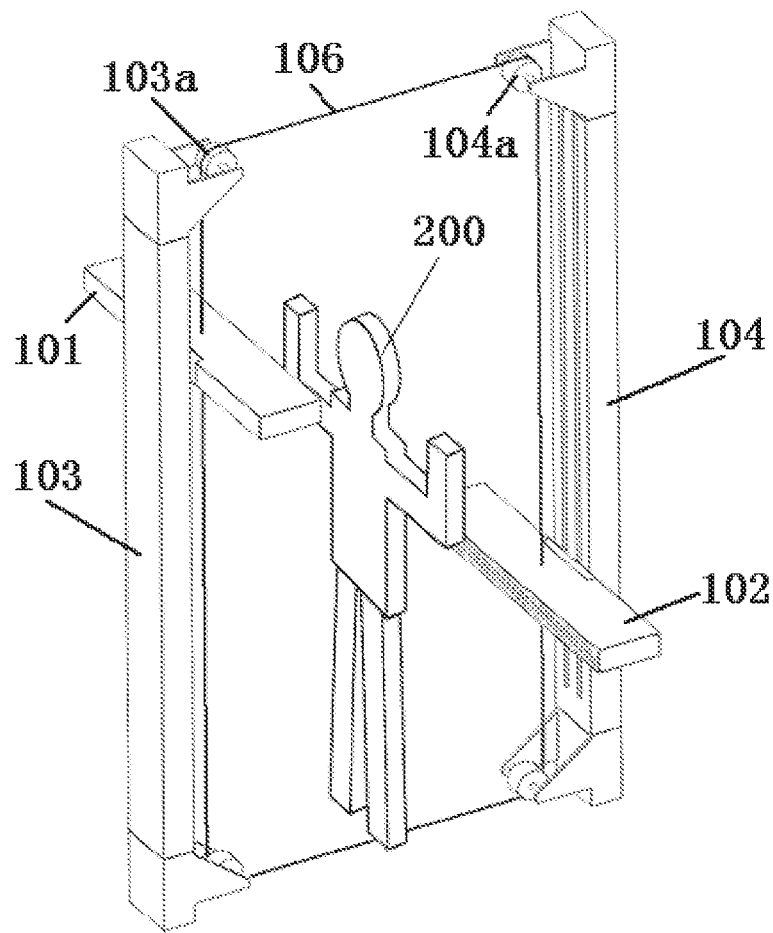
FIG. 2 shows schematically an operation of a millimeter wave three dimensional holographic scan imaging apparatus according to an embodiment of the present invention for inspecting a human body.

FIG. 2 shows schematically the above millimeter wave three dimensional holographic scan imaging apparatus upon scanning an object to be inspected. The object to be inspected 200 (the human body shown in FIG. 2) is located between the first millimeter wave transceiver module 101 and the second millimeter wave transceiver module 102. The first millimeter wave transceiver module 101 and the second millimeter wave transceiver module 102 may respectively perform scanning on the front side and the back side of the object to be inspected 200 to obtain data, providing for the data processing device 107 to generate millimeter wave images.

Figure 3:
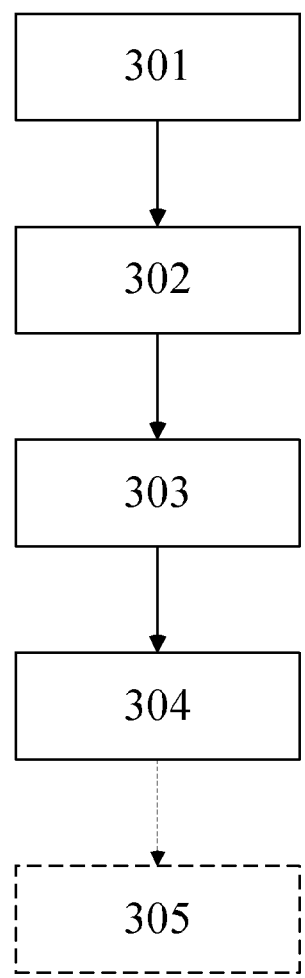
FIG. 3 is a flowchart of a method for inspecting a human body or an article in accordance with an embodiment of the present invention.

The present invention further provides a method for inspecting a human body or an article using a millimeter wave three dimensional holographic scan imaging apparatus, as shown in FIG. 3. The method includes:

a step 301 of locating the human body or the article at an inspection position and setting a first millimeter wave transceiver module 101 and a second millimeter wave transceiver module 102 at their scan beginning positions respectively;

a step 302 of driving the first millimeter wave transceiver module 101 and the second millimeter wave transceiver module 102 by a driver 105a, 105b, 105c, 105d to move from their scan beginning positions to their scan end positions along the first guide rail device 103 and the second guide rail device 104 continuously or discontinuously to finish the scanning to the human body or the article;

a step 303 of transmitting data sampled by the first millimeter wave transceiver module 101 and the second millimeter wave transceiver module 102 during scanning to a data processing device 107, in scanning and/or after the scanning; and a step 304 of processing the data received from the first millimeter wave transceiver module 101 and the second millimeter wave transceiver module 102 using the data processing device 107 to generate a millimeter wave holographic image of the human body or the article.

In the above step 302, during scanning of the first millimeter wave transceiver module 101 and the second millimeter wave transceiver module 102, the kinematic relation between them is constrained by the constrainer 106 such that the first millimeter wave transceiver module 101 and the second millimeter wave transceiver module 102 only move in directions opposed to each other.

As described above, during scanning of the first millimeter wave transceiver module 101 and the second millimeter wave transceiver module 102, the positional relation between the first millimeter wave transceiver module 101 and the second millimeter wave transceiver module 102 may be constrained by the constrainer 106 such that the first millimeter wave transceiver module 101 and the second millimeter wave transceiver module 102 only move in a same speed. Just as described above, as an example, the constrainer 106 may be a rigid connecting line or belt for connecting the first millimeter wave transceiver module 101 and the second millimeter wave transceiver module 102. In the above step 302, the first millimeter wave transceiver module 101 and/or the second millimeter wave transceiver module 102 may be driven to move by driving the first millimeter wave transceiver module 101 and/or the second millimeter wave transceiver module 102 directly, or may be driven to move by driving the constrainer 106.

In order to reduce the signal disturbance between the first millimeter wave transceiver module 101 and the second millimeter wave transceiver module 102, the frequency division (the first millimeter wave transceiver module 101 and the second millimeter wave transceiver module 102 transmit and receive millimeter waves by different frequencies) or the time division (the first millimeter wave transceiver module 101 and the second millimeter wave transceiver module 102 transmit millimeter waves at different times) as described above may be used in the step 302.

In an example, the above method may optionally further include a step 305: after generating the millimeter wave holographic image of the human body or the article, carrying out an automatic identification on whether the human body or the article entrains suspected objects and on the position of the suspected objects and outputting the identified results. With the step 305, the suspected objects may be identified rapidly to avoid risks in security. It is in particular beneficial in applications which need to determine risks in security rapidly, for example, airports, and customs.

Although the present invention has been explained with reference to the drawings, the embodiments shown in the drawings are only illustrative, instead of limiting the present invention.

Although some embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

What the claims is:

1. A millimeter wave three dimensional holographic scan imaging apparatus, comprising:
   a first millimeter wave transceiver module comprising a first millimeter wave transceiver antenna array for transmitting and receiving a first millimeter wave signal;
   a second millimeter wave transceiver module comprising a second millimeter wave transceiver antenna array for transmitting and receiving a second millimeter wave signal;
   a first guide rail device, to which the first millimeter wave transceiver module is connected in slidable form, such that the first millimeter wave transceiver module is moveable along the first guide rail device to perform a first scan on an object to be inspected;
   a second guide rail device, to which the second millimeter wave transceiver module is connected in slidable form, such that the second millimeter wave transceiver module is moveable along the second guide rail device to perform a second scan on the object to be inspected;
   a driver configured to drive the first millimeter wave transceiver module to move along the first guide rail device and/or to drive the second millimeter wave transceiver module to move along the second guide rail device; and
   a constrainer configured to constrain kinematic relation between the first millimeter wave transceiver module and the second millimeter wave transceiver module such that the first millimeter wave transceiver module and the second millimeter wave transceiver module only move in directions opposed to each other,
   wherein the driver comprises a first driver configured to drive the first millimeter wave transceiver module directly, the first millimeter wave transceiver module being connected to the first guide rail device by the first driver, and the driver also comprises a second driver configured to drive the second millimeter wave transceiver module directly, the second millimeter wave transceiver module being connected to the second guide rail device by the second driver, and
   wherein the first millimeter wave signal and the second millimeter wave signal have different frequencies from each other during at least 50% of an entire period of scanning the object to be inspected by both the first millimeter wave transceiver module and the second millimeter wave transceiver module.

2. The millimeter wave three dimensional holographic scan imaging apparatus of claim 1, wherein,
   the constrainer constrains positional relation between the first millimeter wave transceiver module and the second millimeter wave transceiver module such that the first millimeter wave transceiver module and the second millimeter wave transceiver module only move in a same speed.

3. The millimeter wave three dimensional holographic scan imaging apparatus of claim 2, wherein,
   the constrainer is a rigid connecting line or belt for connecting the first millimeter wave transceiver module with the second millimeter wave transceiver module.

4. The millimeter wave three dimensional holographic scan imaging apparatus of claim 3, wherein,
   the first guide device is provided with a first fixed pulley and the second guide device is provided with a second fixed pulley, the connecting line or belt connecting the first millimeter wave transceiver module to the second millimeter wave transceiver module via the first fixed pulley and the second fixed pulley.

5. The millimeter wave three dimensional holographic scan imaging apparatus of claim 1, wherein,
   the first guide rail device and the second guide rail device are parallel to each other.

6. The millimeter wave three dimensional holographic scan imaging apparatus of claim 1, wherein,
the first guide rail device and/or the second guide rail device are/is composed of one rail or a plurality of rails parallel to each other.

7. The millimeter wave three dimensional holographic scan imaging apparatus of claim 1, wherein,
the first millimeter wave transceiver module and/or the second millimeter wave transceiver module move in a vertical plane.

8. The millimeter wave three dimensional holographic scan imaging apparatus of claim 1, wherein,
it further comprises:
a data processing device communicated by wire or wireless to the first millimeter wave transceiver module and/or the second millimeter wave transceiver module to receive scan data from the first millimeter wave transceiver module and/or the second millimeter wave transceiver module and to generate a millimeter wave holographic image; and
a display device communicated to the data processing device to receive and display the millimeter wave holographic image from the data processing device.

9. The millimeter wave three dimensional holographic scan imaging apparatus of claim 8, wherein,
the data processing device is configured to generate a control signal and transmit it to the driver to allow the driver to drive the first millimeter wave transceiver module and/or the second millimeter wave transceiver module to move; or the millimeter wave three dimensional holographic scan imaging apparatus further comprises a separate controller with respect to the data processing device, the separate controller configured to generate a control signal and transmit it to the driver to allow the driver to drive the first millimeter wave transceiver module and/or the second millimeter wave transceiver module to move.

10. The millimeter wave three dimensional holographic scan imaging apparatus of claim 1, wherein,
the time at which the first millimeter wave transceiver antenna array transmits millimeter waves is different from the time at which the second millimeter wave transceiver antenna array transmits millimeter waves, during scanning the object to be inspected by both the first millimeter wave transceiver module and the second millimeter wave transceiver module.

11. A method for inspecting a human body or an article using a millimeter wave three dimensional holographic scan imaging apparatus, comprising:
locating the human body or the article at an inspection position and setting a first millimeter wave transceiver module and a second millimeter wave transceiver module at their scan beginning positions respectively;
driving the first millimeter wave transceiver module and the second millimeter wave transceiver module by a driver to move from their scan beginning positions to their scan end positions along a first guide rail device and a second guide rail device continuously or discontinuously to finish scanning to the human body or the article;
transmitting data sampled by the first millimeter wave transceiver module and the second millimeter wave transceiver module during the scanning to a data processing device, in the scanning and/or after the scanning; and
processing the data received from the first millimeter wave transceiver module and the second millimeter wave transceiver module using the data processing device to generate a millimeter wave holographic image of the human body or the article,
wherein during scanning of the first millimeter wave transceiver module and the second millimeter wave transceiver module, kinematic relation between the first millimeter wave transceiver module and the second millimeter wave transceiver module is constrained by a constrainer such that the first millimeter wave transceiver module and the second millimeter wave transceiver module only move in directions opposed to each other, and
wherein during scanning, driving the first millimeter wave transceiver module and the second millimeter wave transceiver module to move by driving the first millimeter wave transceiver module and the second millimeter wave transceiver module directly, and
wherein a first millimeter wave signal for the first millimeter wave transceiver module and a second millimeter wave signal for the second millimeter wave transceiver module have different frequencies from each other during at least 50% of an entire period of scanning the human body or the article to be inspected by both the first millimeter wave transceiver module and the second millimeter wave transceiver module.

12. The method of claim 11, wherein,
during scanning of the first millimeter wave transceiver module and the second millimeter wave transceiver module, positional relation between the first millimeter wave transceiver module and the second millimeter wave transceiver module is constrained by the constrainer such that the first millimeter wave transceiver module and the second millimeter wave transceiver module only move in a same speed.

13. The method of claim 12, wherein,
the constrainer is a rigid connecting line or belt for connecting the first millimeter wave transceiver module with the second millimeter wave transceiver module.

14. The method of claim 11, wherein,
the time at which the first millimeter wave transceiver antenna array for the first millimeter wave transceiver module transmits millimeter waves is different from the time at which the second millimeter wave transceiver antenna array for the second millimeter wave transceiver module transmits millimeter waves during scanning the human body or the article to be inspected by both the first millimeter wave transceiver module and the second millimeter wave transceiver module.

15. The method of claim 11, wherein,
after generating the millimeter wave holographic image of the human body or the article, carrying out an automatic identification on whether the human body or the article entrains suspected objects and on the position of the suspected objects and outputting the identified results.

* * * * *